A. G. BOOZER, Jr. & G. HILL.
DOFFING MACHINE FOR SPINNING FRAMES.
APPLICATION FILED MAY 31, 1913.

1,142,747.

Patented June 8, 1915.

Fig. 6.

Witnesses

Inventors
Arthur Geo. Boozer Jr.
and
George Hill.

UNITED STATES PATENT OFFICE.

ARTHUR GEORGE BOOZER, JR., OF GREENVILLE, AND GEORGE HILL, OF TUCAPAU, SOUTH CAROLINA, ASSIGNORS TO HOWARD D. COLMAN, LUTHER L. MILLER, AND HARRY A. SEVERSON, COPARTNERS TRADING AS BARBER-COLMAN COMPANY, OF ROCKFORD, ILLINOIS.

DOFFING-MACHINE FOR SPINNING-FRAMES.

1,142,747. Specification of Letters Patent. Patented June 8, 1915.

Application filed May 31, 1913. Serial No. 770,848.

*To all whom it may concern:*

Be it known that we, ARTHUR GEORGE BOOZER, Jr., and GEORGE HILL, citizens of the United States, residing, respectively, at Greenville, county of Greenville, and Tucapau, county of Spartanburg, in the State of South Carolina, have invented certain new and useful Improvements in Doffing-Machines for Spinning-Frames, of which the following is a specification.

This invention relates to doffing machines of the type arranged to travel along the sides of spinning frames for removing full bobbins from its spindles and replacing empty bobbins thereon.

One of the objects of our invention is to provide a novel and improved empty-bobbin magazine and supporting means therefor together with improved mechanism for controlling the passage of the empty bobbins from the magazine to their places on the spindles.

Our invention also refers to a doffing machine which is driven by an electric motor carried by the machine, and it is one of the objects of our invention to provide an improved means for connecting the motor to a source of electric current in a manner which will permit of the necessary traveling movement of the doffing machine along the spinning frame.

Other objects of the invention are to provide improved guide means for the doffer head and improved means for reciprocating the bobbin-seating device.

The invention further relates to the other objects and advantages which will be more specifically set forth in the following detailed description.

In the accompanying drawings, Figure 1 is a fragmental side elevation illustrating the upper portion of a doffing machine embodying the features of our invention, a portion of the empty-bobbin magazine being broken away and the supporting means for the magazine not being illustrated in this view. Fig. 1ª is a detail view illustrating the bobbin feed controlling means in a different position from that shown in Fig. 1.

The machine disclosed in the present application is similar to that shown in our prior applications Serial Numbers 401,308, filed November 8, 1907; 483,821, filed March 16, 1909; 485,001, filed March 22, 1909; 621,317, filed April 15, 1911; and 720,186 and 720,187, filed September 13, 1912. Some of the actuating or controlling mechanism shown in the present application is substantially similar to that shown in certain of said prior applications. Reference may, therefore, be had to said applications for a detailed description of such mechanism. Herein we will describe the mechanism in a general way and only in so far as is necessary in order to obtain a clear understanding of the machine and the relation of the old parts to novel mechanisms comprised in the present invention.

A doffing machine embodying our invention comprises a suitable framework consisting in this instance of two sides 20, a base 21, a table 22 at the upper ends of said sides, a cross-bar 23 extending between said sides, a pair of standards 24 and 25 rising from said table, and a cross-head 26 connecting the upper ends of said standards. The base 21 may have rollers 27 mounted thereon adapted to run upon the floor and support the doffing machine when not in engagement with the spinning frame.

The spinning frame A is equipped with a guide rail B upon which the doffing machine rests and travels along the spinning frame. The rail B is secured to the upper flange of the spindle rail C of the spinning machine. The doffing machine has a pair of flanged rollers 28 adapted to run upon the rail B, said rollers being carried by shafts 29 which are mounted in eccentric bearings 30, said bearings being rotatably mounted in brackets 31 fixed upon the sides 20 of the doffing machine. The bearings 30 have arms 32 thereon which are connected by a link 33, and one of said bearings has a handle 34 fixed thereon by which the bearings may be rotated in the brackets 31. The handle 34 may be provided with suitable latch means 35 to lock it to the bracket 31 in different positions. After the doffing machine has been hooked upon the rail B, the bearings 30 are rotated to raise the doffing machine and carry a toothed propelling wheel, to be later described, into engagement with the toothed or notched lower edge of the guide rail B. A pair of rollers 36 carried by the doffing machine bear against the edge of the lower flange of the spindle rail C being held in engagement therewith by the weight of the doffing machine.

An electric motor 40 is mounted upon the base 21 of the doffer framework and is geared to a vertical shaft 41, which shaft is in turn geared to a gear 42 fixed upon the main actuating shaft 43 of the machine. A toothed propelling wheel 44 is fixed upon a shaft 45 mounted in the cross-bar 23, said wheel being adapted to engage with the guide rail B on the spinning frame. This wheel is operatively connected to the actuating shaft 43 by any suitable means such as a Geneva stop motion, whereby the continuous rotation of the actuating shaft 43 will impart an intermittent rotation to the propelling wheel 44 and will move the doffing machine step by step along the spinning frame. The forward end of the shaft 45 is geared to a vertical shaft 46, the function of which will be presently understood.

Figure 5:
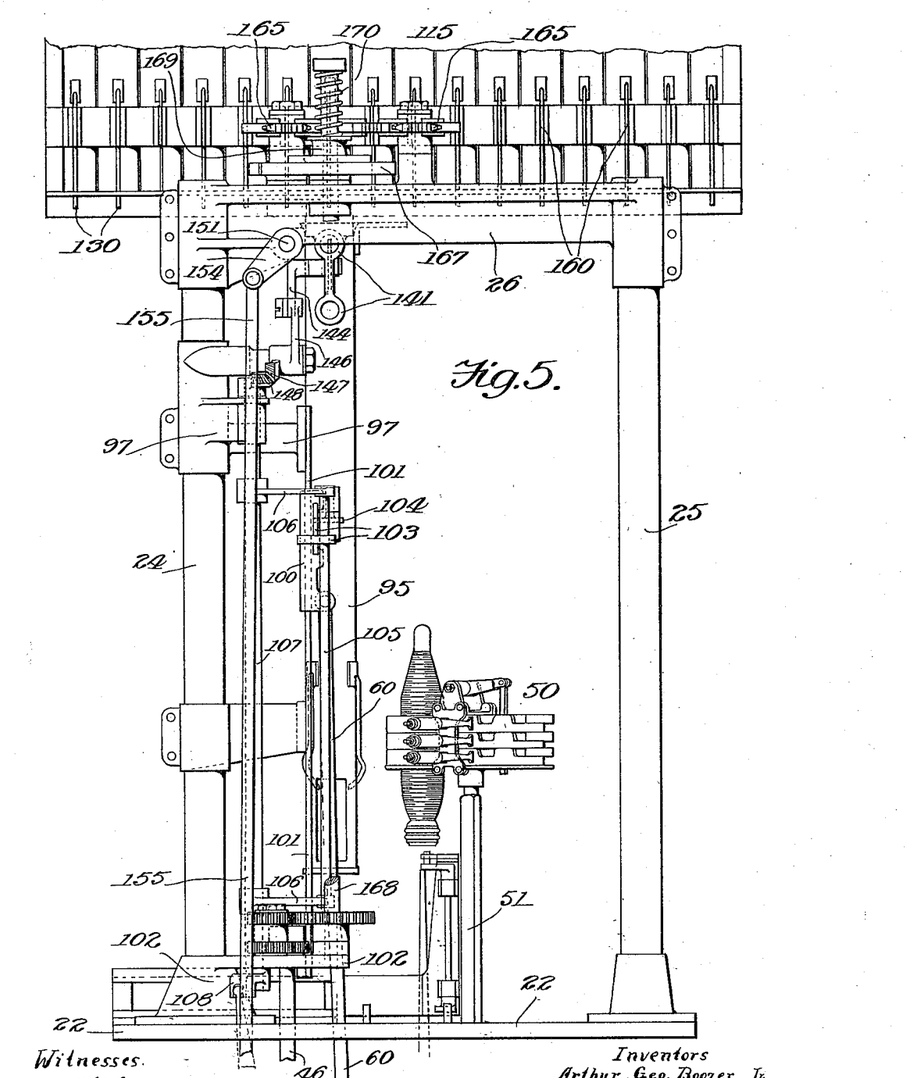
Figs. 5 and 6 taken together constitute a front elevation of the doffing machine illustrated in operative relation to a spinning frame, the upper portion of the magazine in Fig. 5 being broken away.
Figure 6:
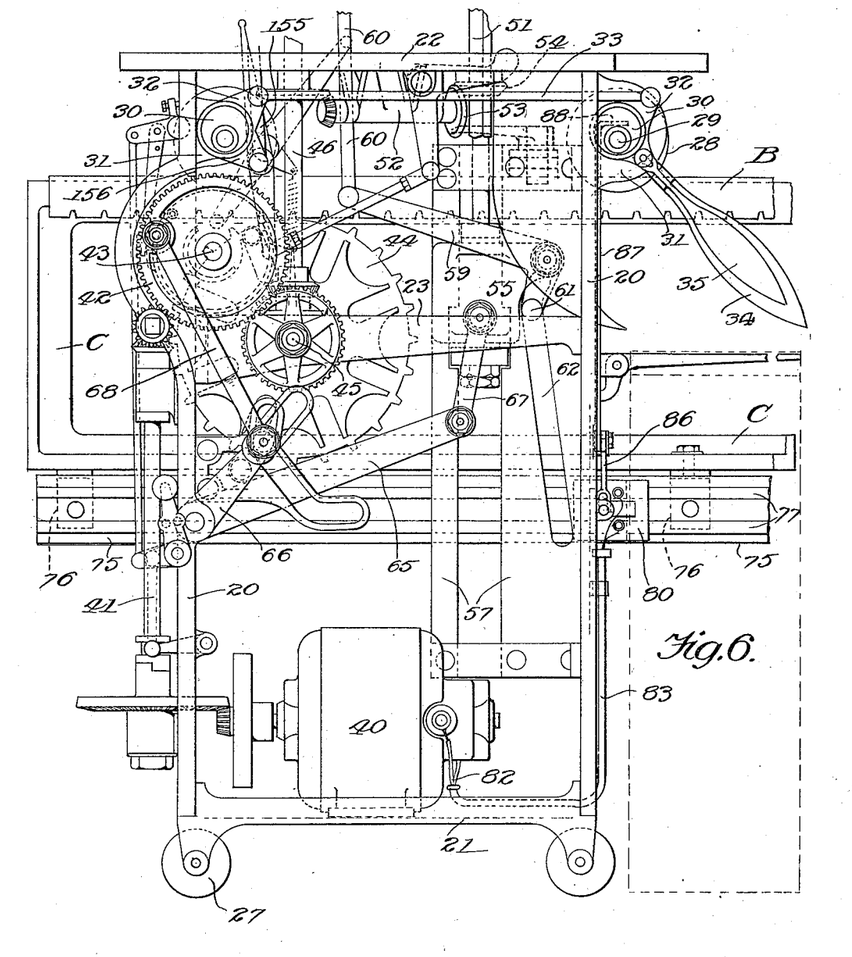
Figure 8:
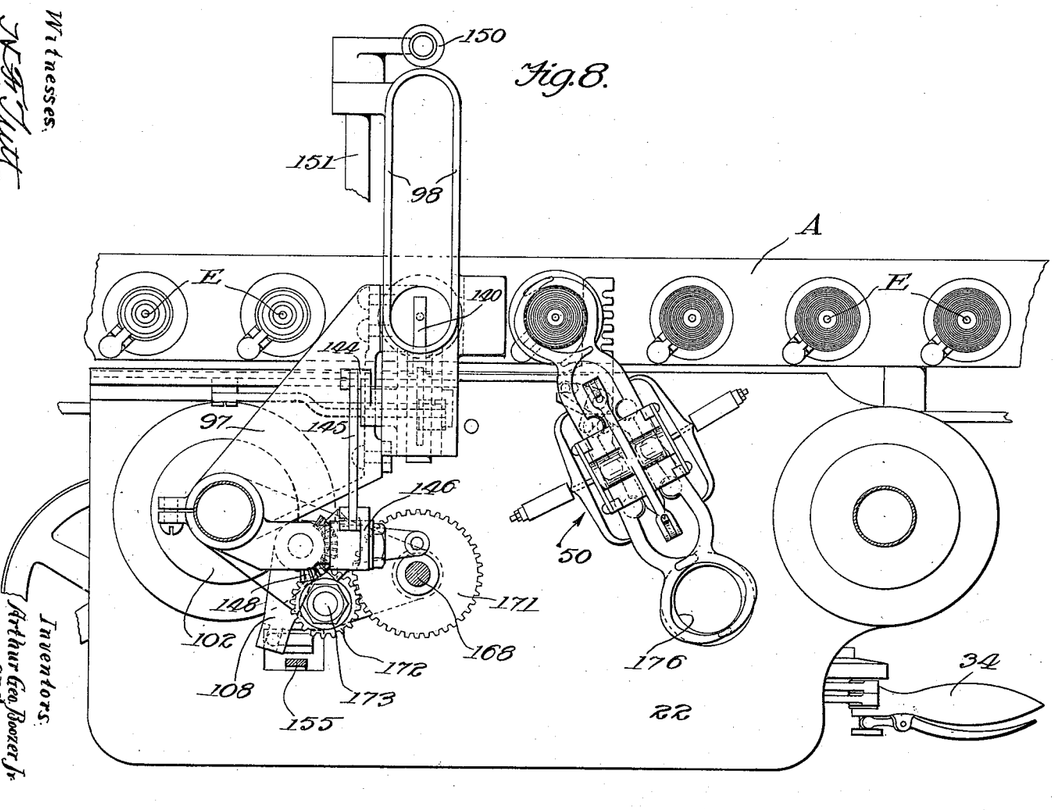
Fig. 8 is a sectional plan view taken substantially in the plane of line 8 8 of Fig. 1, and showing a portion of the spinning frame.

The doffer head 50 which engages and removes the full bobbins from the spindles is of the type fully disclosed in our application Serial No. 621,317, and need not be herein described in detail. This doffer head, as shown most clearly in Figs. 5 and 8, comprises two oppositely extending bobbin-gripping devices, and means to be later described is provided for periodically rotating the head through 180 degrees to bring the gripping devices alternately into position to engage a bobbin. The doffer head is fixed upon the upper end of a vertical doffer bar 51. A horizontal shaft which is mounted in a bearing 52 on the under side of the table 22 is geared at one end to the vertical shaft 46 and has a bevel gear 53 on its other end meshing with a bevel gear 54 rotatably mounted on the under side of the table. The doffer bar 51 is non-circular in cross section and extends through a non-circular opening in the gear 54, whereby the doffer bar may reciprocate through said gear but will be rotated whenever the gear is rotated. The intermittent rotation imparted to the shaft 45 from the main actuating shaft 43 will be transmitted to the doffer bar so as to periodically rotate said bar through an arc of 180 degrees.

Figure 12:
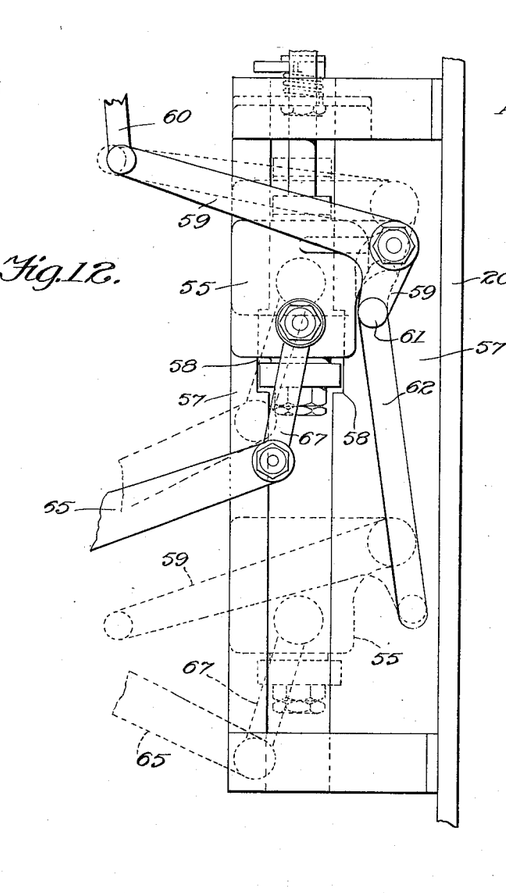
Fig. 12 is a fragmental front elevation of the lower portion of the machine illustrating the means for guiding the doffer head and the means for reciprocating the bobbin-seating device.
Figure 13:
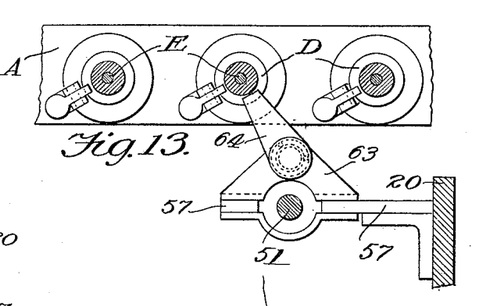
Fig. 13 is a horizontal sectional detail view showing a portion of the spinning frame and the device on the doffing machine for engaging the whirls to prevent withdrawal of the spindles.
Figures 14, 15, 16:
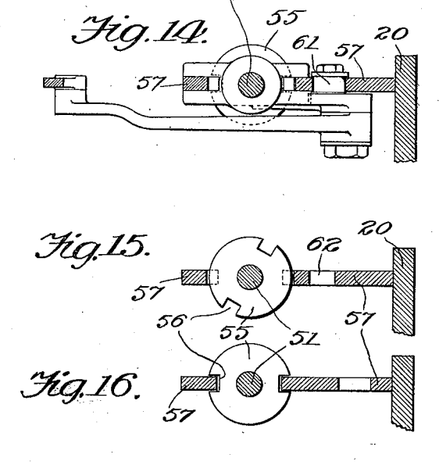
Fig. 14 is a horizontal section on the line 14 14 of Fig. 12.
Figs. 15 and 16 are horizontal sections through the doffer slide and the guide therefor showing the parts in two different positions.

The lower end of the doffer bar is fixed in a slide 55 (see Figs. 6 and 12 to 16) which has grooves 56 in opposite sides to engage with the inner edges of a pair of guide plates 57 fixed to one of the sides 20 of the framework. The guide plates 57 are notched or cut away as at 58 to permit the necessary rotation of the doffer head and the slide 55 when the doffer head is at its upper limit of movement. A bell-crank lever 59 is mounted on a projection on the slide 55, one end of said lever being connected by a link 60 to a vertically reciprocable bobbin-seating device to be later described. The other arm of said bell-crank lever has a stud 61 lying in a cam slot 62 in one of the guide plates 57. In the reciprocation of the slide 55 the cam slot 62 will swing the lever 59 to move said bobbin-seating device. The latter has a greater length of traveling movement than the doffer head, and it is therefore necessary that the end of the lever 59 move through a greater distance than the movement of the slide 55. This is effectively accomplished by the arrangement of the lever and the cam slot, as is clearly illustrated by the dotted line positions in Fig. 12. On the rear side of one of the guide plates 57 is a bracket 63 (Fig. 13) on which is pivoted for horizontal movement a finger 64 which is adapted to overlie the whirls D on the spindles E to prevent upward removal of said spindles when a full bobbin is pulled therefrom by the doffer head. The finger 64 is yieldingly mounted to swing to one side so as to pass the spindles in the traveling movement of the doffing machine.

The slide 55, bar 51 and doffer head 50 may be reciprocated by any suitable means. The means herein shown is similar to that disclosed in certain of our prior applications above mentioned and comprises a pair of levers 65 and 66 (see Fig. 6) rigidly connected together and pivoted on the framework, the lever 65 being connected at its free end by a link 67 to the slide 55 and the lever 66 being connected by a link 68 to a wrist pin on the gear wheel 42.

Figures 2, 3, 4:
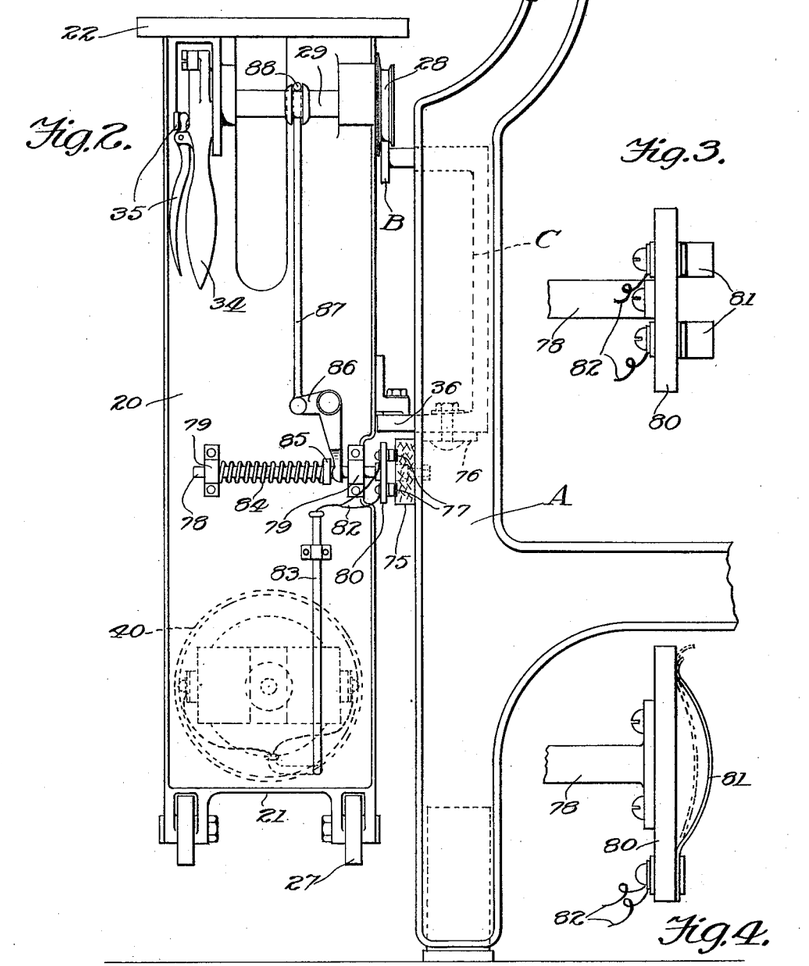
Fig. 2 is a side elevation of the lower portion of the doffing machine taken from the side opposite to that shown in Fig. 1. In these two figures the doffing machine is illustrated in operative relation to a spinning frame.
Figs. 3 and 4 are detail views illustrating a collector shoe comprised in the means for supplying electric current to the driving motor.

The means for supplying current to the electric motor 40 will now be described. A bar 75 of insulating material extends longitudinally along the side of the spinning frame and is secured thereto by any suitable means such as brackets 76 fixed to the lower flange of the spindle rail C. The bar 75 has a pair of contact strips 77 in its forward face, which strips are suitably connected to a source of electric current. A horizontal rod 78 is slidably mounted in a pair of bearings 79 on the outer face of one of the frame sides 20 (see Figs. 2 and 6), and on the rear end of this rod is fixed a head 80 of insulating material. Said head has mounted thereon a pair of contact devices, in the present instance in the form of curved leaf springs 81, each adapted to slide in contact with one of the strips 77. A pair of wires 82 are connected to the binding posts by which the springs 81 are secured, said wires running through a suitable conduit 83 and being connected at their other ends to the electric motor 40. A coil compression spring 84 surrounding the rod 78 bears at one end against one of the bearings 79 and at its other end against a collar 85 on said rod, said spring tending to slide said rod rearwardly and force the contact springs 81 into engagement with the strips 77 so as to effect a good electrical connection therewith. A bell-crank lever 86 is pivoted on the doffer frame and has one arm bifurcated to engage the collar 85 on the rod 78, the other arm of said lever being connected to a link 87 which extends upwardly and has an angular upper end 88 overlying the shaft 29 on which one of the supporting rollers 28 is mounted. When the doffing machine is in operative relation to the spinning frame, the roller 28 and the shaft 29 will occupy their lowermost position with respect to the doffer framework, and the link 87 will permit the bell-crank lever 86 to occupy an idle position, as shown in Fig. 2, so that the spring 84 can force the contact springs 81 into engagement with the conductor strips 77. When, however, the handle 34 is rotated to lower the doffer framework so as to carry the propelling wheel 44 out of engagement with the guide rail B, the changing position of the doffer framework with respect to the shaft 29 will swing the bell-crank lever 86 and compress the spring 84 to withdraw the head 80 and contact springs 81 from their operative position. Thus by the act of associating the doffing machine with the spinning frame or removing it therefrom the current-collecting shoe is automatically positioned or withdrawn as the case may be.

The donning tube 95, which receives empty-bobbins from the magazine and directs them onto the empty spindles, is carried by two brackets 96 and 97 fixed upon the vertical standard 24. An enlarged or flared guide portion 98 is provided at the upper end of the donning tube to properly receive the empty bobbins from the magazine and guide them downwardly. Mounted at the lower end of the donning tube is a plurality of fingers 99 having their ends extending into the donning tube to engage and support a bobbin. Said fingers are arranged to yield to permit the bobbin to be forced downwardly past them by the bobbin-seating means. This bobbin-seating means may be of any preferred construction being herein shown as substantially similar to that of our prior applications. Briefly, the means comprises a slide 100 mounted upon a vertical guide bar 101 having its ends fixed respectively in the bracket 97 and in a bracket 102 in which the standard 24 is seated. The slide 100 is attached to the upper end of the vertical link 60 previously described, whereby the slide will be reciprocated. A horizontal slide 103 (Fig. 5) mounted in the slide 100 carries a yieldable bobbin-seater 104 which is arranged to be projected into the donning tube 95 and moved downwardly therein to engage a bobbin and force it past the fingers 99 and seat it upon the spindle E. The horizontal slide 103 is moved by a vertical rod 105 extending through an elongated opening in said slide and having its ends fixed in a pair of arms 106 which are fixed upon a vertical rock shaft 107. The rock shaft 107 has its ends mounted in the brackets 97 and 102, respectively, and has fixed on its lower end an arm 108 arranged to be periodically rocked by a lever 109, said lever being arranged to be swung by a cam on the inner face of the gear 42.

Figure 9:
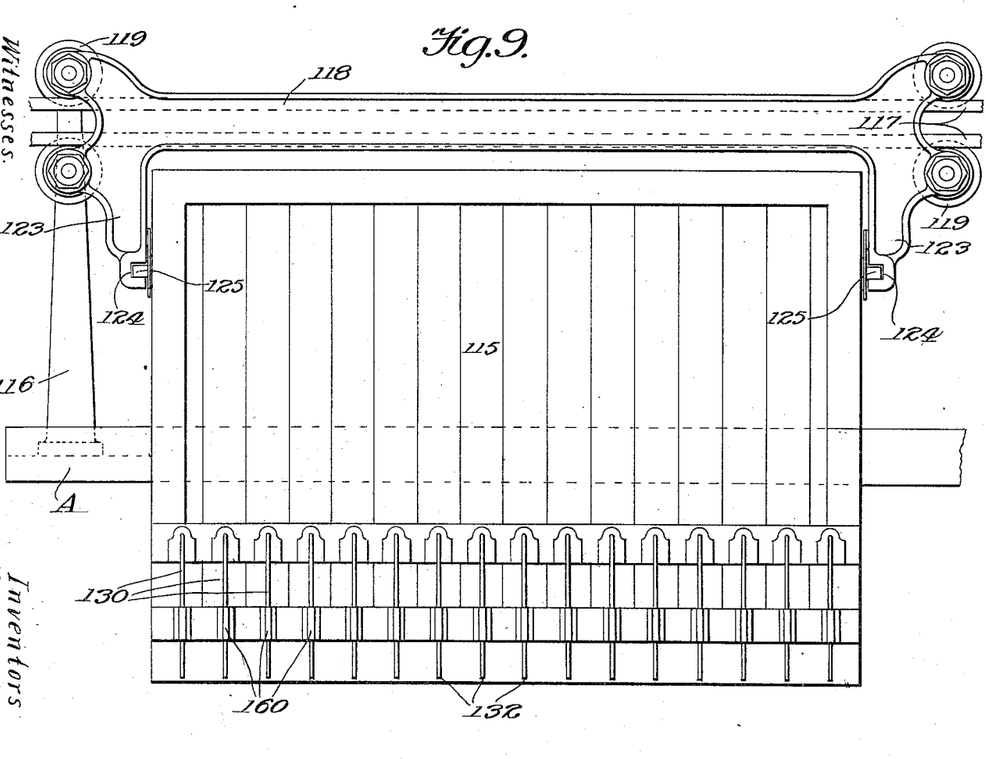
Figs. 9 and 10 are respectively front and side elevations of the empty-bobbin magazine, the views illustrating a portion of the spinning machine and the means for supporting the magazine thereon.
Figures 10, 11:
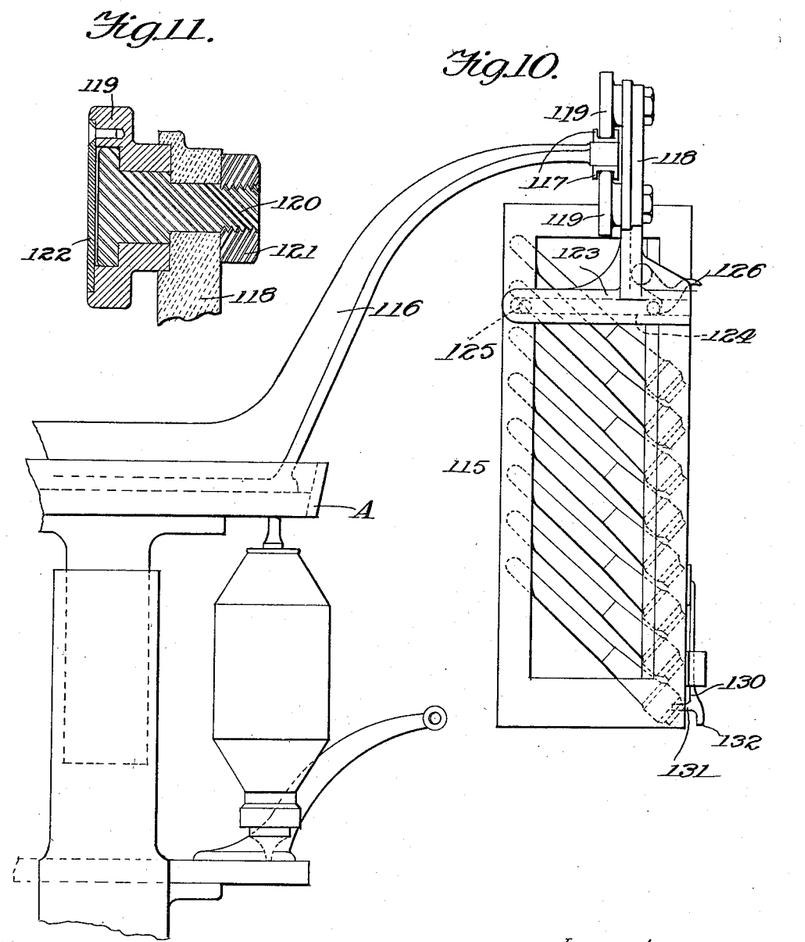
Fig. 11 is a sectional detail view of one of the rollers on the carriage which supports the magazine.

The magazine 115 for empty bobbins is, in the present instance, supported by the spinning frame. The magazine is arranged to travel with the body of the doffing machine along the spinning frame, and is also arranged to have a relative traveling movement with respect to said body. The means herein shown for supporting the magazine comprises a suitable number of arms 116 secured to the spinning frame and carrying a pair of guide rails 117 at their forward ends. (See Figs. 9 and 10.) A carriage 118 has pairs of rollers 119 at its opposite ends which engage the grooves in the upper and lower guide rails 117. The rollers 119 may be mounted in any suitable manner, the preferred construction being illustrated in Fig. 11 in which a shouldered bolt 120 extends through an opening in the carriage 118 and is rigidly fixed in place by a nut 121 threaded thereon. The roller 119 is rotatably mounted upon this bolt and is recessed to receive the head of the bolt, said recess being closed by a suitable closing plate 122. The plate 122 serves to retain a lubricant in the space between the roller 119 and the bolt 120. In depending arms 123 at opposite ends of the carriage 118 are formed grooves 124 closed at their rear ends and adapted to receive suitable projections or pins 125 on opposite ends of the bobbin magazine. The carriage 118 remains at all times in engagement with the guide rails 117, but the magazine may be withdrawn from the grooves 124 to be refilled with bobbins. Accidental withdrawal of the magazine may be prevented by a latch 126 mounted on the carriage and arranged to lie in front of one of the pins 125.

Figure 7:
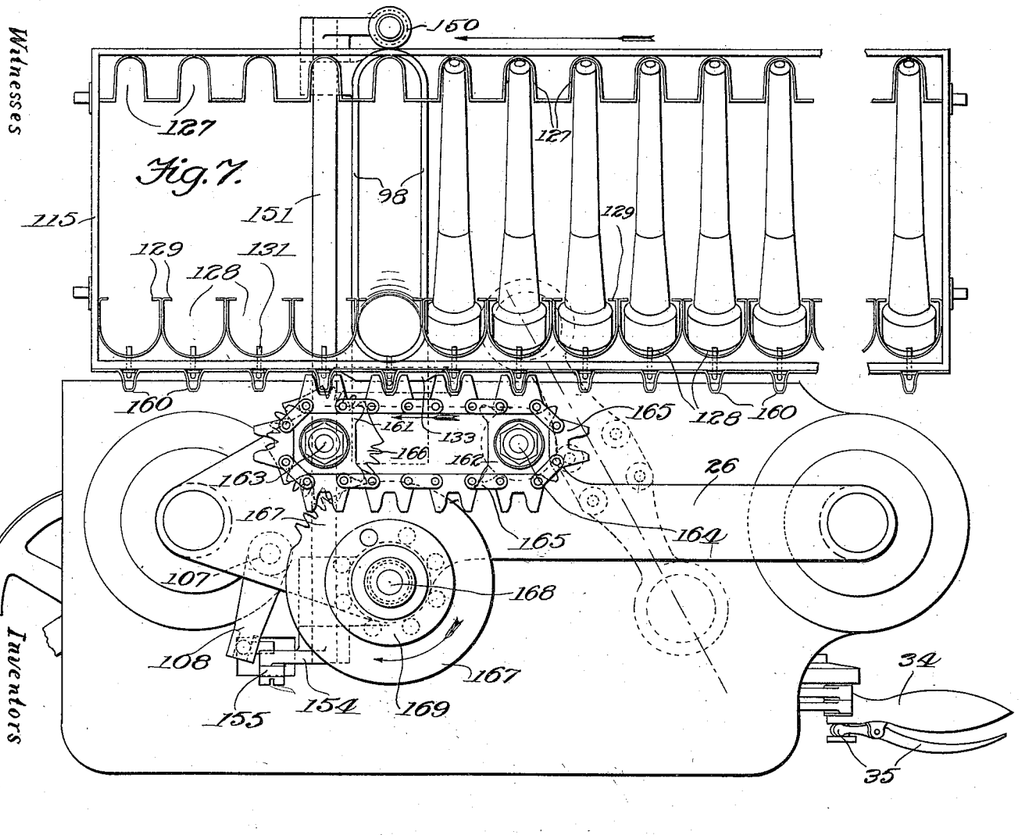
Fig. 7 is a top plan view of the doffing machine including the empty-bobbin magazine, the supporting means for said magazine not being illustrated in this view.

The magazine is rectangular in shape and consists of an open frame having means at its inner side to provide a plurality of vertical channels each adapted to receive a tier of bobbins. These channels may be formed by any suitable means, that shown in the drawings comprising a thin sheet of suitable material secured to one side of the frame of the magazine and folded to provide relatively narrow grooves or recesses 127 (Fig. 7) to receive the tips of the bobbins. To the other side of the magazine frame is secured a series of U-shape strips providing relatively wide recesses or grooves 128 located opposite the above-mentioned grooves and adapted to receive the butts of the bobbins. If desired, flanges 129 may be formed at the edges of recesses 128 to overlie the butts of the bobbins and hold them in place. As shown most clearly in Fig. 10, the width of the magazine, or in other words the length if the spaces provided for the bobbins is less than the length of the bobbins, the latter lying in the magazine in an inclined position with their butts lowermost, and each bobbin resting on the one next below. Suitable means is provided to extend into each of the butt channels 128 at its lower end and engage the lowermost bobbin of each tier to prevent accidental discharge of the bobbins. In the form shown in the drawings, this retaining means comprises a series of individual spring dogs 130 secured at their upper ends to the magazine frame, and each having a tooth 131 at its lower end to project into one of the bobbin channels and enter the opening in the butt of the lowermost bobbin. Each dog 130 also has a projection 132 arranged to be engaged by a cam 133 having inclined ends, said cam being fixed upon the top cross head 26 of the doffer framework in proper position to withdraw the dog tooth 131 from the particular channel in the magazine which lies directly above the flaring guide 98 for the donning tube, as illustrated most clearly in Fig. 7. The guide 98 is flattened or oblong and underlies a single one of the bobbin compartments in the magazine.

Figures 1, 1A:
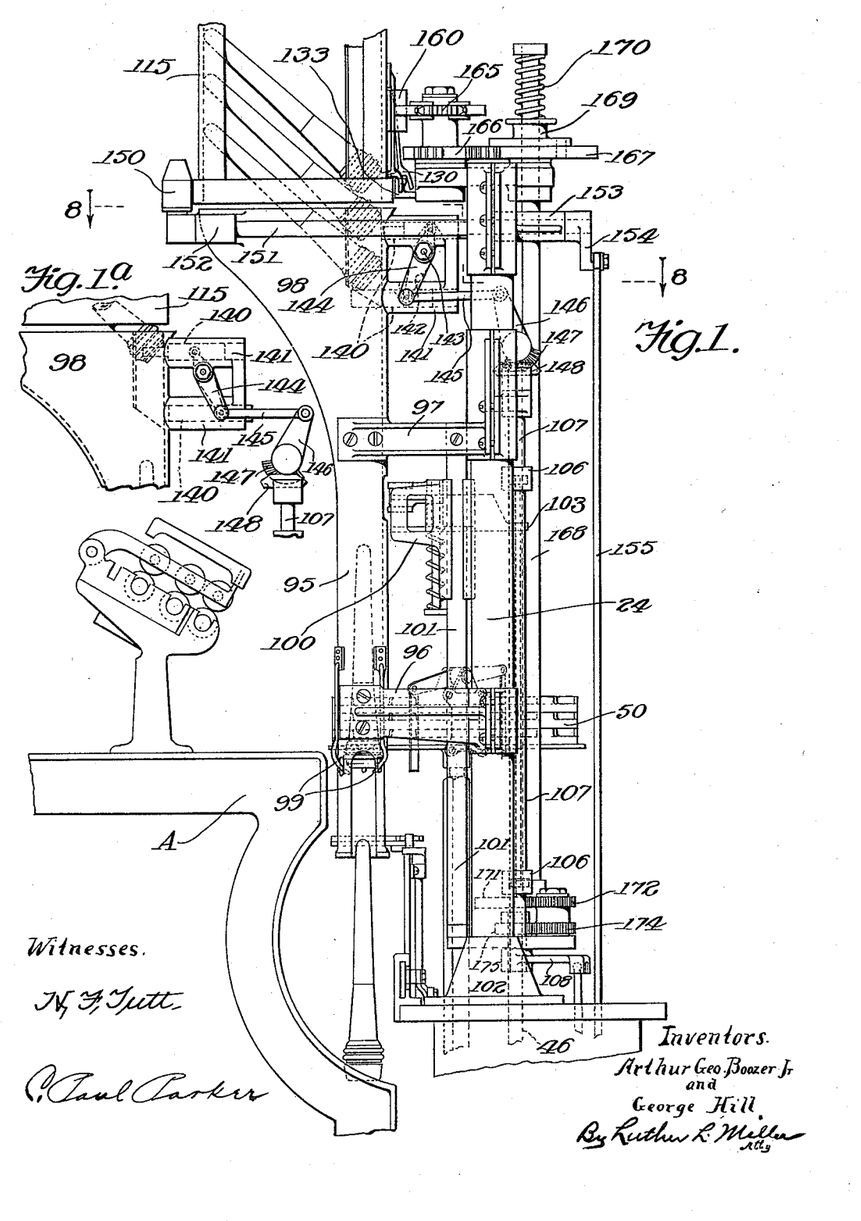

When the particular dog 131 is withdrawn from the bobbin channel, the tier of bobbins therein will settle into the guide 98 until the lowermost bobbin is arrested by controlling means mounted upon said guide. This controlling means in the preferred form herein shown comprises two sliding dogs 140 (see Figs. 1 and 1$^a$) mounted in suitable bearings 141, said dogs being arranged to be alternately projected into said guide. A lever 142 is fixed on a rock shaft 143 and has its opposite ends connected to the sliding dogs 140. An arm 144 also fixed on said rock shaft is connected by means of a link 145 to an arm 146 pivotally mounted on the bracket 97 on the vertical standard 24. Rigid with the arm 146 is a gear segment 147 which meshes with a gear segment 148 fixed on the upper end of the vertical rock shaft 107. The periodical oscillation of the shaft 107 will, through the means just described, cause the sliding dogs to be alternately projected into the flaring guide 98. The movement of these dogs is such that when the lower one is withdrawn from beneath the lowermost bobbin to permit the latter to descend in the donning tube, the upper dog will engage the next bobbin above as shown in Fig. 1$^a$ and prevent its descent. When said upper dog is withdrawn to permit the tier of bobbins to settle, the lower dog will be in the position shown in Fig. 1 so as to catch the lowermost bobbin in its descent.

The bobbin-magazine may be held in proper relation to the doffing machine by a roller stud 150 carried by the rear end of a horizontal rock shaft 151 mounted in bearings 152 and 153 upon the guide tube 98 and cross-head 26, respectively. The forward end of this rock shaft has an arm 154 fixed thereon to which arm is attached the upper end of a long link 155 (Figs. 1 and 5), the lower end of said link being attached to an arm 156 rigid with one of the bearings 30 in which the supporting rollers 28 of the doffer are mounted. It will be seen that when the relative vertical positions of the rollers 28 and the doffer framework are changed in the process of associating the doffer with the spinning frame or removing it therefrom, the roller 150 at the rear side of the bobbin-magazine will, through the means just described, be moved into and out of operative position to engage the magazine.

As hereinbefore suggested, the bobbin-magazine moves with the doffing machine along the spinning frame, the bobbins being discharged one by one from the bobbin compartment in the magazine which is positioned above the donning tube. When the last bobbin in a compartment has been dissharged, the magazine is moved with respect to the doffing machine to place the next succeeding tier of bobbins above the donning tube. The mechanism for locking the magazine to the doffing machine, and for imparting this relative movement thereto will now be described. A horizontal series of teeth 160 are fixed upon the forward side of the magazine, said series constituting a rack by which the magazine is moved. This rack may be of any suitable construction, but for the sake of lightness is preferably formed by bending a strip of sheet metal. A pair of toothed wheels 161 and 162 are mounted upon stub shafts 163 and 164, respectively, which are mounted in the top cross-head 26 of the doffer framework. An endless toothed member 165 is mounted on these wheels and is arranged to interengage with the rack 160 on the bobbin-magazine. The endless member 165 may be in the form of a chain having links recessed to receive the teeth of the rack 160. A mutilated gear segment 166 is fixed on the stub shaft 163 and is arranged to mesh with a corresponding mutilated gear 167 which is mounted upon the upper end of a vertical drive shaft 168. In the present instance, the gear element 166 has four series of teeth spaced alternately with four portions having concave edges. The gear element 167 has a single series of teeth arranged to successively engage the individual series of teeth on gear 166, said gear 167 having a smooth periphery except for its teeth which periphery is arranged to slide in contact with the concave edges on gear 166 to prevent relative motion between the two gears except when their teeth are in mesh. Preferably, the gear element 167 is secured to its shaft 168 by a clutch collar 169 splined on said shaft and having a tooth or pin to enter recesses or openings in the gear element 167. A compression spring 170 tends to hold the clutch collar 169 in engagement with the element 167 to normally lock the latter to the shaft 168. On the lower end of the shaft 168 is fixed a gear wheel 171 meshing with a pinion 172 fixed on a stub shaft 173 (Fig. 8) which is mounted in the bottom bracket 102 of the vertical standard 24. Another pinion 174 fixed on said stub shaft meshes with a pinion 175 which is fixed on the upper end of the vertical shaft 46. The gears 171, 172, 174 and 175 act as change-speed gearing between the shafts 46 and 168.

Means is provided for manually stopping the mechanism at will and for automatically stopping it when the machine reaches the end of the spinning frame or in case the mechanism fails to perform certain functions. Means is also provided for severing the thread running from the spindle to the bobbin just after it is doffed. The doffer head is opened and closed at the proper time by suitable devices. We have deemed it unnecessary to herein describe these and other mechanisms inasmuch as they form no part of the present invention.

In the operation of the machine, the doffer head descends about a full bobbin on its spindle, grasps the bobbins and rises, removing the bobbin from its spindle, and when the doffer head reaches its uppermost position it is given a half revolution to position the opposite bobbin-gripping device above the spindles. In the next descent of the doffer head this latter gripping device will engage the bobbin, and the former gripping device will open to release its bobbin, the latter descending through an opening 176 in the table 22 (see Fig. 8). The empty bobbins are successively fed from the magazine 115 into the donning tube 95 and are seated upon their spindles by the bobbin-seater 104. After a full bobbin has been doffed and an empty bobbin supplied to its spindle, the doffing machine is advanced one step along the spinning frame to position the parts above the next succeeding spindles when the doffing and donning operation is again performed. The mechanism for moving the magazine is so timed that when the last bobbin in any tier in the magazine has been discharged, the magazine will be moved one step with respect to the doffer body so as to position the next adjacent tier of bobbins above the donning tube. In this relative movement of the magazine, the retaining dog for the tier about to be used rides up on the cam 133 and is withdrawn into inoperative position to permit the tier of the bobbins to feed downwardly. The machine travels the entire length of the spinning frame and automatically replaces the full bobbins on the spindles with empty ones.

While we have herein described the present embodiment of our invention in considerable detail for the sake of clearness, we recognize the fact that many variations and modifications of the structure disclosed in the drawings may be made without departing from the spirit and scope of our invention. We would therefore have it understood that we aim to cover all such forms as fall within the scope of the appended claims.

We claim as our invention:

1. The combination with a spinning frame, of doffing mechanism comprising a body portion mounted on said frame to travel and having thereon a bobbin guide along which the bobbins descend by gravity, a bobbin-magazine mounted on the spinning frame independently of said body portion and adapted to contain a plurality of vertical tiers of bobbins with their butts lowermost, means for controlling the discharge of bobbins from one of said tiers into said bobbin guide, and means for moving the magazine with relation to said body portion to position a new tier of bobbins in operative relation to said guide.

2. The combination with a spinning frame, of doffing mechanism comprising a body portion mounted on the spinning frame to travel, and having a guide to direct empty bobbins onto the spindles, a bobbin-magazine mounted on the spinning frame independently of said body portion and arranged to travel with said body portion and also to have a traveling movement with relation to said body portion, said magazine having a plurality of compartments each arranged to contain a vertical tier of bobbins resting sidewise on each other, means permitting the discharge of the bobbins singly and successively into said guide, and mechanism for moving the magazine with relation to said body portion when the last bobbin of a tier has been discharged to position a new tier of bobbins in operative relation to said guide.

3. The combination with a spinning frame, of doffing mechanism comprising a framework mounted on said frame to travel, a vertical donning tube carried by said framework, a bobbin-magazine mounted on the spinning frame independently of said framework and having a plurality of vertical channels in two opposite sides to receive the opposite ends of bobbins and hold the bobbins sidewise in vertical tiers with one bobbin resting on the other, the upper end of said donning tube being positioned beneath one of said tiers of bobbins, means for controlling the passage of the bobbins from the magazine, and means for bodily moving the magazine with relation to said framework to successively position the tiers above said donning tube.

4. A doffing machine comprising a body having a bobbin guide mounted thereon, a pair of stops arranged to be alternately projected into said guide for controlling the passage of bobbins along the guide, a bobbin-magazine having a plurality of bobbin compartments each containing a tier of bobbins resting one on the other, movable stop means for each compartment normally preventing the escape of the bobbins from the magazine, means mounted on said body portion for moving the magazine with relation to the body portion, whereby to place successive bobbin compartments in the magazine in position to discharge bobbins into said bobbin guide, and means mounted on said body portion for successively operating said stop means to permit a tier of bobbins as a whole to descend in the magazine and into said bobbin guide and rest on said pair of stops.

5. A doffing machine comprising a body portion having a donning tube with an elliptical upper end, a magazine having therein a plurality of vertical bobbin compartments, the length of which is slightly less than the length of the bobbins therein, whereby the bobbins are held in tiers resting one on the other in an inclined position, and means for intermittently moving the magazine with relation to the body portion to successively position single bobbin compartments longitudinally above said elliptical upper end of the donning tube.

6. The combination with a spinning frame having two horizontal guides thereon, of doffing mechanism comprising a body portion mounted to travel along one of said guides, a bobbin magazine mounted on the other guide and arranged to travel with the said body portion, said magazine having a plurality of vertical compartments of less length than the length of a bobbin, whereby the bobbins will be held in tiers resting one on the other in the compartments in a position inclined with reference to the vertical and horizontal, said body portion having a bobbin guide thereon, and means for moving the magazine with relation to the body portion to successively position the bobbin compartments in operative relation to said bobbin guide.

7. The combination with a spinning frame having a guide rail thereon, of a doffing mechanism comprising a magazine mounted on said guide rail to travel along it, said magazine having a plurality of vertical bobbin channels therein providing spaces shorter than the length of the bobbins, whereby the bobbins will be supported in an inclined position with their butts lowermost, a donning tube positioned beneath the magazine, and means for traversing the magazine with relation to the donning tube to successively position the bobbin channels above said tube.

8. The combination with a spinning frame having guide rails mounted thereon, of a doffing mechanism comprising a body portion mounted on one of said rails, a magazine mounted on the other rail, said magazine having a plurality of vertical bobbin channels shorter than the length of the bobbins therein, whereby the bobbins will be held in an inclined position with their butts lowermost, a donning tube on the body portion having an elongated upper end arranged to lie beneath one of said bobbin compartments only, means for controlling the discharge of the bobbins from the magazine into said donning tube, and mechanism for moving the magazine with relation to said body portion to position the successive bobbin compartments above said donning tube.

9. A doffing machine comprising a bobbin-guide, a magazine positioned above said guide and arranged to contain a plurality of tiers of bobbins, an individual stop for each tier normally preventing escape of the bobbins from the magazine, means for bodily moving the magazine with respect to said bobbin-guide to successively position the tiers of bobbins above said guide, means for withdrawing the stop for the tier above said guide and for holding the said stop withdrawn to permit the entire tier to feed downwardly, and means adjacent to said guide for controlling the subsequent descent of the bobbins one by one.

10. A doffer comprising a bobbin-guide, a bobbin-magazine mounted above said guide, a rack on said magazine, a toothed drive chain meshing with said rack, a continuously driven shaft, and means operatively connecting said shaft and said toothed chain and arranged to impart an intermittent movement to the latter.

11. A doffer comprising a framework, a bobbin-magazine having a row of teeth thereon, a pair of gear elements mounted on said framework, an endless toothed member running over said gear elements and meshing with the teeth on said magazine, and means for imparting an intermittent rotation to one of said gear elements.

12. A doffing machine comprising a framework, a bobbin-magazine having a row of teeth thereon, a pair of gear elements, an endless chain running over said elements and having portions meshing with the teeth on the magazine, a drive shaft, a mutilated wheel fixed thereon, and a mutilated gear rigid with respect to one of said gear elements and meshing with the first-mentioned mutilated gear for imparting an intermittent movement to said endless chain.

13. In a doffing machine, the combination of a vertical donning tube, a pair of stops arranged to be alternately projected into said tube, the lower stop being adapted to engage the lowermost bobbin, and the upper stop being adapted to engage the next bobbin above when the lower stop is withdrawn, a vertical rock shaft, a vertically oscillating arm, intermeshing gear segments fixed to said arm and to said rock shaft, and a lever pivoted between its ends and having its ends connected to said stops, a link attached at one end to said arm and operatively connected at its other end to said lever, and means at the lower end of said rock shaft for rocking the latter to discharge the bobbins.

14. The combination with a spinning frame having two guide rails thereon, of doffing mechanism mounted to travel on one of said rails a carriage mounted to travel along the other rail, and a magazine for empty bobbins having a disengageable connection with said carriage and arranged to be supported thereby.

15. The combination with a spinning frame having two guide rails thereon, of doffing mechanism mounted to travel on one of said rails a carriage mounted to travel along the other rail, a magazine for empty bobbins, and a connection between said carriage and said magazine for supporting the latter, said connection permitting the magazine to be horizontally withdrawn from said carriage.

16. The combination of a spinning frame having a guide rail thereon, a doffing mechanism arranged to travel along the spinning frame, a carriage having rollers running on said rail, for supporting the carriage on the spinning frame independently of the doffing mechanism and a magazine supported by said carriage and being disengageable therefrom to permit of refilling the magazine.

17. The combination with a spinning frame, of doffing mechanism comprising a body portion mounted to travel along said frame, a magazine for empty bobbins mounted on said frame to travel with said body portion, means for imparting relative movement between said magazine and said body portion, and a roller stud carried by said body portion and engaging the magazine to hold it in proper position.

18. The combination with a spinning frame having two guide rails thereon, of doffing mechanism comprising a body portion mounted to travel along one of said rails, a magazine mounted on the other rail to travel with said body portion, said body portion having supporting rollers to engage the guide rails, said rollers being movable to vertically adjust the body portion with respect to the spinning frame, said body portion and magazine being arranged to have relative traveling movement, a guide mounted on said body portion and engaging the magazine, and an operative connection between said guide and said supporting rollers, whereby when the latter are operated said guide will be moved into and out of guiding relation to said magazine.

19. The combination with a spinning frame, of doffing mechanism comprising a body portion mounted thereon, a bobbin-magazine mounted on the spinning frame, a horizontal rock shaft carried by the body portion, a roller stud mounted at an angle on the rear end of said shaft and arranged to engage the magazine, and means for rocking said shaft.

20. The combination with a spinning frame having a guide rail thereon, of a carriage mounted to travel along said rail and having a pair of depending arms provided with horizontal grooves closed at their rear ends, a magazine for empty bobbins having projections on opposite ends arranged to slide into said grooves, and means mounted on the carriage and arranged to engage one of said projections to prevent accidental removal thereof.

21. In a doffing machine, in combination, a pair of guide members, a slide having grooves in opposite sides to receive said guide members, a doffer head mounted on said slide, and means for rotating said doffer head and said slide, said guide members being cut away at a certain point to permit rotation of said slide.

22. In a doffing machine, in combination, a pair of vertical guide plates, a slide having a grooved connection with said plates, whereby to guide the slide in its reciprocation along said plates, said plates being notched at a certain point to permit rotation of said slide, a doffer head mounted on said slide, means for reciprocating said slide, and means rotating said slide while in register with the notches in said guide plates.

23. In a doffing machine, in combination, a reciprocable device, a reciprocatory slide, a bell-crank lever pivoted on said slide and connected to said device, and a cam arranged to swing said lever in the reciprocation of said slide, whereby to reciprocate said device.

24. In a doffing machine, in combination, two parts mounted for reciprocation, a lever mounted on the first part and connected to the second part, and a stationary cam arranged to swing said lever during the reciprocation of the first part, whereby to reciprocate the second part.

25. In a doffing machine, in combination, a guide, a slide mounted thereon for reciprocation, a lever pivoted on said slide, said guide having a cam slot therein, and said lever having a portion engaging in said slot, whereby when the slide is reciprocated said lever will be swung, and a reciprocatory device connected to said lever.

26. In a doffing machine, in combination, a guide, a slide mounted for reciprocation thereon, a doffer head attached to said slide, a lever pivoted on said slide, a cam extending longitudinally of said guide and arranged to swing said lever in reciprocation of said slide, and a bobbin-seating device connected to said lever.

27. In a doffing machine, in combination, a pair of vertical guide plates, a slide mounted to reciprocate thereon, a doffer head carried by said slide, a bell-crank lever pivoted on said slide, one of said plates having a vertically extending cam slot therein, a stud on one arm of said bell-crank lever extending into said slot, and a reciprocable bobbin-seating device connected to the other arm on said lever.

28. In a doffing machine, in combination, doffing means mounted for vertical reciprocation and for horizontal rotation, guide means with which a portion of said doffing means has a tongue and groove engagement, said guide means being cut away at one point, means for reciprocating said doffing means, and means for rotating the doffing means when said portion thereof is in register with the cut-away portion of said guide means.

29. The combination of a spinning frame having a spindle rail, an insulating bar secured to said rail, a pair of conducting strips mounted on the forward side of said bar, a guide rail on the spinning frame running parallel to said rail and bar, a doffing machine mounted to travel on said guide rail and comprising a framework, an electric motor mounted in the framework, operating mechanism driven by said motor, a horizontal rod mounted in the framework for sliding movement in the plane of said insulating bar, a spring tending to slide said rod rearwardly, an insulating head fixed on the rear end of said rod, a pair of conducting pieces mounted on said head and adapted to contact with the strips on said bar, and means electrically connecting said pieces on the head with the motor.

30. A doffing machine comprising a framework, an electric motor mounted therein, a collector device movably mounted on the framework and electrically connected to the motor, a supporting roller movably mounted on said framework, means for moving said roller with relation to said framework, and means operable by the aforesaid means for changing the position of said collector device.

31. A doffing machine comprising a framework, an electric driving motor mounted therein, a collector device movably mounted on the framework and electrically connected to said motor, spring means tending to move said collector device into operative position, a supporting roller movably mounted on said framework, means for adjusting said roller with respect to said framework, a lever pivoted on the framework and engaging said collector device, and a link connected to said lever and engaging said roller adjusting means, whereby the position of said roller will determine the position of said collector device.

32. A doffing machine having adjustable supporting rollers and an electric driving motor mounted thereon, and having a collector device movably mounted thereon and electrically connected to said motor, means tending to move said collector device into operative position, and means operatively connected to the supporting rollers for the doffer and having a yielding connection with the collector device for withdrawing said collector device from operative position.

In testimony whereof we affix our signatures in the presence of two witnesses.

ARTHUR GEORGE BOOZER, JR.
GEORGE HILL.

Witnesses:
ALFRED MOORE,
W. B. SMITH.

Copies of this patent may be obtained for five cents each, by addressing the "Commissioner of Patents, Washington, D. C."